(12) United States Patent
Marsden et al.

(10) Patent No.: US 8,390,572 B2
(45) Date of Patent: Mar. 5, 2013

(54) DYNAMICALLY LOCATED ONSCREEN KEYBOARD

(75) Inventors: Randal J. Marsden, Edmonton (CA); Steve Hole, Edmonton (CA)

(73) Assignee: Cleankeys Inc., Edmonton, Alberta (CA)

( * ) Notice: Subject to any disclaimer, the term of this patent is extended or adjusted under 35 U.S.C. 154(b) by 0 days.

(21) Appl. No.: 13/365,719

(22) Filed: Feb. 3, 2012

(65) Prior Publication Data
US 2012/0133589 A1    May 31, 2012

Related U.S. Application Data

(63) Continuation of application No. 13/308,416, filed on Nov. 30, 2011, and a continuation-in-part of application No. 12/234,053, filed on Sep. 19, 2008, and a continuation-in-part of application No. 13/171,124, filed on Jun. 28, 2011.

(Continued)

(51) Int. Cl.
*G06F 3/02* (2006.01)
*G06F 3/041* (2006.01)
*G09G 5/00* (2006.01)

(52) U.S. Cl. ........................... 345/168; 345/173
(58) Field of Classification Search .................... 345/168
See application file for complete search history.

(56) References Cited

U.S. PATENT DOCUMENTS

| | | | |
|---|---|---|---|
| 6,492,979 B1 | 12/2002 | Kent et al. | |
| 6,504,530 B1 | 1/2003 | Wilson et al. | |
| 6,525,717 B1 | 2/2003 | Tang | |
| 6,650,318 B1 | 11/2003 | Arnon | |
| 6,657,616 B2 | 12/2003 | Sims | |
| 6,762,749 B1* | 7/2004 | Gouzman et al. | 345/163 |
| 7,339,580 B2* | 3/2008 | Westerman et al. | 345/173 |
| 7,499,039 B2 | 3/2009 | Roberts | |
| 7,557,312 B2 | 7/2009 | Clark et al. | |
| 7,659,885 B2 | 2/2010 | Kraus | |
| 7,663,607 B2 | 2/2010 | Hotelling et al. | |
| 7,813,774 B2* | 10/2010 | Perez-Noguera | 455/575.1 |
| 8,019,390 B2* | 9/2011 | Sindhu | 455/566 |
| 2005/0104867 A1* | 5/2005 | Westerman et al. | 345/173 |
| 2005/0190970 A1* | 9/2005 | Griffin | 382/209 |
| 2006/0192763 A1 | 8/2006 | Ziemkowski | |
| 2006/0232558 A1 | 10/2006 | Chien | |
| 2006/0279548 A1* | 12/2006 | Geaghan | 345/173 |
| 2006/0284858 A1 | 12/2006 | Rekimoto | |
| 2007/0229476 A1* | 10/2007 | Huh | 345/173 |
| 2007/0236478 A1 | 10/2007 | Geaghan et al. | |
| 2007/0247429 A1 | 10/2007 | Westerman | |
| 2008/0042978 A1* | 2/2008 | Perez-Noguera | 345/168 |
| 2008/0042989 A1 | 2/2008 | Westerman | |
| 2008/0273013 A1 | 11/2008 | Levine et al. | |

(Continued)

FOREIGN PATENT DOCUMENTS

WO    2007144014 A1    12/2007

*Primary Examiner* — Quan-Zhen Wang
*Assistant Examiner* — Nelson D Runkle, III
(74) *Attorney, Agent, or Firm* — Lowe Graham Jones PLLC

(57) ABSTRACT

A touch-sensitive display surface having touch-capacitive and vibration sensors. This surface allows the user to rest their fingers on the keys of an onscreen keyboard and type as they would on a regular keyboard. As the user places their fingers on the touch screen, the system relocates the onscreen keyboard to the location where the fingers are resting. The touch sensors report the signal strength level of each key touched to a processor, but no keystroke is issued by the processor until a corresponding "tap" (i.e., vibration) is detected. When a tap is detected, the processor references the status of the touch capacitance sensors before, during, and/or immediately after the moment in time the tap occurred. The size, position, and orientation of the onscreen keyboard keys are dynamically set as determined by the user initiating a home-row definition event by resting their fingers momentarily on a virtual home-row.

22 Claims, 10 Drawing Sheets

Related U.S. Application Data

(60) Provisional application No. 61/418,279, filed on Nov. 30, 2010, provisional application No. 61/472,799, filed on Apr. 7, 2011, provisional application No. 60/973,691, filed on Sep. 19, 2007, provisional application No. 61/359,235, filed on Jun. 28, 2010.

(56) References Cited

U.S. PATENT DOCUMENTS

2008/0309519 A1   12/2008   Bengtsson et al.
2010/0323762 A1*  12/2010   Sindhu .................. 455/566

* cited by examiner

DYNAMICALLY LOCATED ONSCREEN KEYBOARD

PRIORITY CLAIM

This application is a Continuation of U.S. Utility application Ser. No. 13/308,416 filed Nov. 30, 2011, which claims the benefit of U.S. Provisional Applications Ser. Nos. 61/418,279 filed Nov. 30, 2010, and 61/472,799, filed Apr. 7, 2011, is a Continuation-in-Part of U.S. Utility applications Ser. No. 12/234,053 filed Sep. 19, 2008, which claims the benefit of U.S. Provisional Application Ser. No. 60/973,691 filed Sep. 19, 2007, and is a Continuation-in-Part of U.S. Utility application Ser. No. 13/171,124 filed Jun. 28, 2011, which claims the benefit of U.S. Provisional Application Ser. No. 61/359,235 filed Jun. 28, 2010.

FIELD OF THE INVENTION

The invention relates to a smooth touch-sensitive surface that allows the user to rest their hands or fingers on the surface without causing an event actuation. More specifically, the touch surface is a dynamic display presenting an onscreen keyboard that is used for inputting text and commands.

BACKGROUND OF THE INVENTION

The origin of the modern keyboard as the primary method for inputting text and data from a human to a machine dates back to early typewriters in the $19^{th}$ century. As computers were developed, it was a natural evolution to adapt the typewriter keyboard to be used as the primary method for inputting text and data. While the implementation of the keys on a typewriter and subsequently computer keyboards have evolved from mechanical to electrical and finally to electronic, the size, placement, and mechanical nature of the keys themselves have remained largely unchanged.

Computers have evolved from "desktop" configurations to more portable configurations known as "laptops", "notebooks", "netbooks" or "portables". These laptop computers typically have a mechanical keyboard integrated as part of the device. This type of integrated keyboard has the advantage of being similar in size and feel to stand-alone keyboards typically used in conjunction with desktop computers. However, the inclusion of a keyboard results in the portable computer having two parts: the display and the keyboard. Most portable computer models incorporate a "clamshell" design with the keyboard portion forming the base and the display portion forming the lid. Thus the presence of a keyboard on the portable computer results in it being roughly twice the size it would otherwise need to be.

In the past decade, a new form of portable computing device has emerged, commonly referred to as a "tablet" computer. This type of portable computing device typically does not have an integrated keyboard, relying instead solely on touch as the primary means of human-computer interface. Many believe tablets and eventually "touch surfaces" that are integrated into daily life will become the standard way humans will interface with "computers" in the future.

While this new paradigm of touch-centric computing has many advantages, one marked disadvantage is the lack of a keyboard. Although external physical keyboards can typically be connected to touch-screen computers, it often defeats the purpose of the device and negates its advantages over traditional laptop computers.

As the evolution of computing devices has progressed toward touch-based user interfaces, a natural evolution for the idea of a keyboard has been to carry it into the virtual world of the computer display.

Auer et al., in U.S. Pat. No. 4,725,694, describe a system wherein one or more images of simulated keyboards are displayed on a touch-sensitive screen of a computer, and in response to the touching of the simulated keys, generate appropriate control signals. In a later refinement of this concept, the image of the keyboard is displayed floating above other applications running on the computer, rather than occupying a dedicated portion of the screen. The user interacts with this "on-screen keyboard" or "virtual keyboard" by either directing a cursor pointer over it, or directly touching the keys via a touch screen using a finger or stylus.

On-screen keyboards, such as that described by Auer, have been primarily used for devices that lack a standard keyboard, such as certain public information kiosks and personal digital assistants (PDAs), Smartphones, Tablets, and other handheld computers that are too small to accommodate a physical keyboard. Onscreen keyboards are also frequently used by individuals who have physical challenges that prevent them from using a conventional electromechanical keyboard.

Smaller touchscreen devices such as PDAs and Smartphones don't have sufficient screen size to allow people to type on an onscreen keyboard using the conventional method of touch-typing with multiple fingers. As a result, a plethora of inventions have sought to provide alternative text input methods that require less physical space than a conventional keyboard layout.

Grover et al., in U.S. Pat. No. 5,818,437, describe a system that reduces the number of distinct keys required by assigning multiple letters on each key. This allows for fewer keys and thus takes less onscreen space. Other inventions that similarly aim at reducing the size of an onscreen keyboard and/or make it easier to input text on a small screen include: Lee, U.S. Pat. No. 6,292,179; Kaehler, U.S. Pat. No. 5,128,672; Vargas, U.S. Pat. No. 5,748,512; Niemeier, U.S. Pat. No. 5,574,482; Van Kleeck, U.S. Pat. No. 6,008,799; and Perlin, U.S. Pat. No. 6,031,525.

While these inventions have varying benefits for entering text on a small on-screen keyboard, they don't allow text entry at speeds that compare to standard "ten-finger" typing on a conventional keyboard.

In an effort to increase typing speed, Robinson et al., in U.S. Pat. No. 7,277,088, describe a system wherein disambiguation algorithms allow the user to be less accurate as they select each letter of a word on the keys of an onscreen keyboard. The allowance for less precision presumably leads to the user being able to type faster.

Kushler et al., in U.S. Pat. No. 7,098,896, describe a system that allows single-finger (or stylus) text entry caused by the user setting down on the key representing the first letter of a desired word, then, while remaining in contact with the touch surface, sliding from key to key of each subsequent letter of the word. This has the benefit of eliminating the motion of lifting and setting down on the onscreen keyboard for every letter, thus speeding text entry. Disambiguation algorithms allow the user to be less accurate when selecting each letter, lending further to an increase in speed.

Swype®, a commercialized version of technology described by Kushler et al., was used to set the world record for fastest typing on a Smartphone. The record-breaking individual input a prescribed phrase at a speed of 61 words per minute. While that speed is remarkable, given that it is based on single-finger entry, it still falls well below the fastest speeds possible using ten-finger typing.

Another approach is to use voice recognition systems to input text by verbal utterances. While this technology has significantly improved over recent time, even if it were working 100% accurately, there are many times when text input by verbal utterances is not desirable by the user (such as during times where privacy or consideration of others within audible range is required). And, thus, an alternative way of entering text through some sort of keyboard paradigm is still necessary.

Thus, for larger touch screens that can accommodate ten-finger typing, it is desirable to find a yet faster way for entering text that more closely matches the typing style learned on conventional keyboards. In doing so, there are three primary challenges: first, overcoming the relatively large amount of display real estate required for a 10-finger onscreen keyboard. Second, overcoming the lack of tactile feedback common in mechanical keyboards. And third, allowing the user to rest their fingers on the "home-row" position on the onscreen keyboard, as they normally would on a conventional electromechanical keyboard.

Marsden et al., in U.S. Patent Application No. 2009/0073128, overcomes the problem by allowing the user to rest their fingers on the touch-sensitive surface and detecting intended key presses using both touch and vibration sensors working in correlation one with the other. This method, however, assumes the keyboard keys are in a fixed position and thus take up substantial space on the dynamic display of the portable device. Further, because the positions of the keys are fixed, the user must take care to see that their fingers are tapping in the right place. Tactile markers such as indents where the keys are located help the user feel the keys without looking However, placing tactile markers on a touch-screen device is impractical.

Traditional electromechanical keyboards have long used the concept of a "home-row": the keys on which the user orients and rests their fingers as they prepare to type. This concept is particularly important to users who have learned to 10-finger type without looking at the keys. By orienting on the home-row (including using the special "markers" found on certain keys on the home-row), the user knows where to move their fingers to type the desired letter, symbol, number, or function. This allows the user to type quickly without looking at their fingers, and instead can concentrate on the text they are composing.

The prevalence of computers, email, and text messaging in today's society has yielded a much higher percentage of "touch typers" than a generation ago (when typing classes were normally only provided to those intending to pursue a vocation in secretarial arts). In fact, such keyboarding skills are now often taught early in the educational curriculum of young children. Ten-finger (or "touch") typing is still the fastest and most reliable known way for composing text.

SUMMARY OF THE INVENTION

The present invention provides systems and methods that allow the user to rest their fingers on the keys of an onscreen keyboard displayed on a touch-sensitive screen and dynamically define the location, orientation, shape, and size of the onscreen keyboard. Rather than the user having to take care to place their fingers on the keys (which typically would require tactile markers on said keys), the system dynamically moves the location of the onscreen keyboard to where the user's fingers are already resting.

In one aspect of the invention, the process defines a "home-row definition event", which is an action performed by the user that causes the system to redefine where the home-row of the onscreen keyboard is located. This location is dynamically established based on the user's action.

In another aspect of the invention, the home-row definition event is defined as the user resting all four fingers of both hands simultaneously on the touch-sensitive surface for a preset period of time (e.g., 1 second).

In still another aspect of the invention, the home-row definition event is defined as the user double-tapping all four fingers of both hands on the touch-sensitive surface and then resting them on the surface after a second tap.

In yet another aspect of the invention, the home-row definition event is defined as the user resting all four fingers of both hands simultaneously on the touch-sensitive surface and then pressing them down momentarily.

These actions (as well as others) are initiated by the user to indicate to the system that the user's fingers are in the home-row resting position. The system of the present invention then orients the onscreen keyboard accordingly. Note that the keys on the home-row needn't be in a continuous line (as they are on most electromechanical keyboards). Rather, the location of each key on the home-row is defined by the placement of the user's eight fingers during a home-row definition event as sensed by touch sensors, and then extrapolated for keys that are not "home-row resting keys". In this way the home-row could be along two separate lines, one for each hand placement, or may even form two curves.

Note that this method requires the system of the present invention to differentiate between the user setting down and resting their fingers on the touch-sensitive display surface and the user intending to type by tapping on a virtual key. Such a method is described in Marsden, U.S. Patent Application Ser. No. 2009/0073128, which is hereby incorporated by reference.

Once a home-row definition event has taken place, the system provides feedback to the user in numerous ways. In one aspect of the invention, the system provides visual feedback by causing the onscreen keyboard to appear beneath the user's fingers. In another aspect of the invention, the system provides an audible cue. In yet another aspect of the invention, the system causes the touch-screen to momentarily vibrate.

In one aspect of the invention, according to the user's preference, the onscreen keyboard remains visible continuously while typing is taking place. Alternatively, the onscreen keyboard becomes transparent after the home-row definition event. In another aspect of the invention, the onscreen keyboard becomes semitransparent, so as to allow the user to see through the keyboard to content on the screen below.

In yet another aspect of the invention, the onscreen keyboard cycles between visible and invisible as the user types. Each time the user taps on the "hidden" onscreen keyboard, the onscreen keyboard temporarily appears and then fades away after a user-settable amount of time.

In yet another aspect of the invention, only certain keys become visible after each keystroke. The keys which become temporarily visible are those keys that are most likely to follow the immediately preceding text input sequence (as determined by word and letter databases stored in the system).

In yet another aspect of the invention, the onscreen keyboard becomes temporarily visible when the user, with fingers resting in the home-row position, presses down on the surface with their resting fingers.

In still yet another aspect of the present invention, the onscreen keyboard becomes visible when the user performs a predefined action on the edge of the enclosure outside of the touch sensor area, such as a double- or triple-tap.

In one aspect of the invention, the home-row resting keys are defined as the eight keys rested upon by the four fingers of each hand. In yet another aspect of the invention, the resting keys may be fewer than eight keys to accommodate users who may not have use of all eight fingers.

In another aspect of the invention, the system disambiguates which key was intended according to movement of a particular finger in an intended direction. For example, the user lifts their ring finger and moves it slightly downward and taps. The user may not have moved far enough to reach the virtual location of the adjacent key, but their intention was clearly to select it since they moved from their resting position by a definable threshold distance and tapped in the direction of the adjacent key. Even though the tap may not have occurred on the adjacent key in this example, the system will select it.

In another aspect of the invention, the system adjusts the probability of each key being selected, based on the text sequence that immediately preceded it. This probability is used in conjunction with the tap location algorithm described in the previous paragraphs to determine the most likely key the user intended to tap on.

In yet another aspect of the invention, the system automatically accounts for "user drift" as they type on the onscreen keyboard. Without the benefit of tactile feel for each key, it is easy for the user to move their hands slightly as they type. The system tracks this behavior by comparing the center of the intended key with the actual location that the user tapped. If a consistent drift is detected over the space of consecutive key events, the system shifts the location of the keys accordingly to accommodate the drift. Again, rather than make the user take care where the keys are, the system moves the keys to where the user's fingers are already located.

If the user drifts too far to the point of straying off of the touch-sensitive area, the system warns them with an audible, visual, and/or vibrating cue.

In another aspect of the invention, the method and system monitor for user taps that are on the surface of the portable computing device, but not within the boundaries of the touch sensor. For example, the user may tap an edge of the device's enclosure to indicate a spacebar actuation. As with other tap events, the system correlates the signals from the touch sensors and vibration sensors to determine the tap location. When an absence of signal is detected by the touch sensor, the system recognizes the event as an "external tap" (i.e., a tap on the surface of the device, but outside the boundaries of the touch sensors). External taps generate unique vibration waveforms depending on their location on the enclosure. Characteristics of these waveforms are stored in a database and are used to uniquely identify the general location of the external tap. The external taps, once identified, can be assigned to keyboard functions (such as space, or backspace).

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
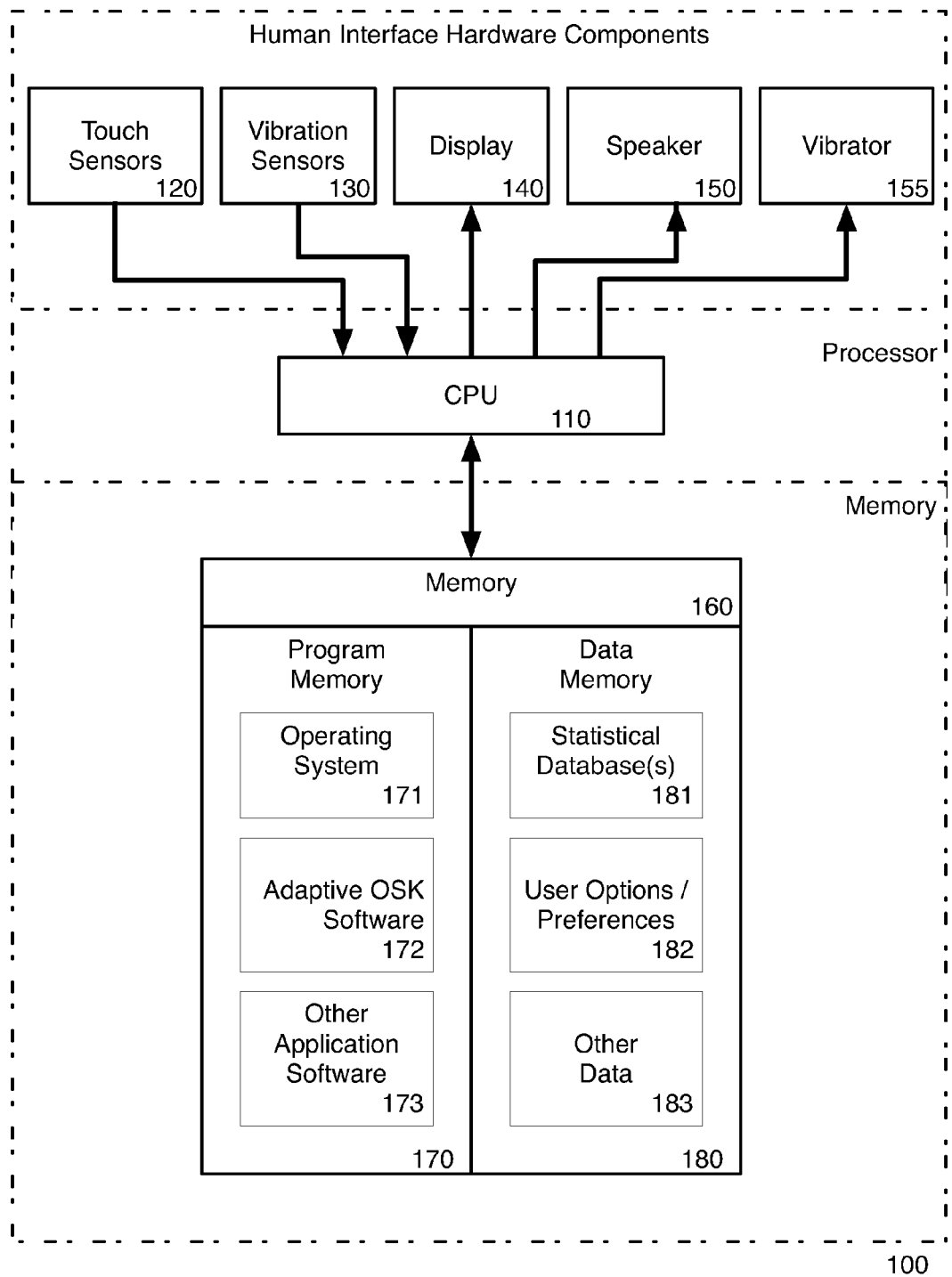
FIG. 1 is a block diagram showing an exemplary system formed in accordance with an embodiment of the present invention.

FIG. 1 shows a block diagram of an exemplary device 100 for providing an adaptive onscreen keyboard user interface for alphanumeric input. The device 100 includes one or more touch sensors 120 that provide input to a CPU (processor) 110. The touch sensors 120 notify the processor 110 of contact events when a surface is touched. In one embodiment, the touch sensor(s) 120, or the processor 110, include a hardware controller that interprets raw signals produced by the touch sensor(s) 120 and communicates the information to the processor 110, using a known communication protocol via an available data port. The device 100 includes one or more vibration sensors 130 that communicate signals to the processor 110 when the surface is tapped, in a manner similar to that of the touch sensor(s) 120. The processor 110 generates a keyboard image that is presented on a display 140 (touch surface) based on the signals received from the sensors 120, 130. A speaker 150 is also coupled to the processor 110 so that any appropriate auditory signals are passed on to the user as guidance (e.g., error signals). A vibrator 155 is also coupled to the processor 110 to provide appropriate haptic feedback to the user (e.g., error signals). The processor 110 is in data communication with a memory 160, which includes a combination of temporary and/or permanent storage, and both read-only and writable memory (random access memory or RAM), read-only memory (ROM), writable nonvolatile memory, such as FLASH memory, hard drives, floppy disks, and so forth. The memory 160 includes program memory 170 that includes all programs and software such as an operating system 171, adaptive onscreen keyboard ("OSK") software component 172, and any other application programs 173. The memory 160 also includes data memory 180 that includes a word database(s) 181, a record of user options and preferences 182, and any other data 183 required by any element of the device 100.

Once a home-row event has been detected by the processor 110 based on signals from the sensors 120, 130, the processor 110 positions a virtual on-screen keyboard beneath the user's fingers on the display 140. As the user types, the processor 110 constantly monitors the placement of the user's fingers, as well as tapped locations for each key actuation, and makes adjustments to the location, orientation, and size of each key (and the overall keyboard) to ensure the on-screen keyboard is located where the user is typing. In this way, it is possible to account for the user's "drifting", or moving their fingers off of the original position of the on-screen keyboard. If the user drifts too far in one direction so-as to reach the edge of the touch sensor area, the processor 110 outputs an audible and/or haptic warning.

At any time, the user may manually re-assign the location of the on-screen keyboard by initiating a home-row definition event (as described above).

In one embodiment, haptic feedback is provided via the vibrator 155 when the user positions their index fingers on the keys commonly-referred to as the "home keys" (F and J keys on a typical English keyboard). In one embodiment, a momentary vibration is issued when the user rests their fingers on the keys using a slightly different frequency of vibration for left and for right. In this manner, the user may choose to move their hands back into a fixed home-row position, when the user chooses the processor 110 to not dynamically change the position of the on-screen keyboard. In another embodiment, the intensity of these vibrations may change depending upon finger position relative to the home keys of the fixed home-row.

The device 100 allows the user to type without looking at their fingers or the virtual keyboard. It follows, then, that the keyboard need not be visible at all times. This allows valuable screen space to be used for other purposes.

In one embodiment, the visual appearance of the keyboard varies its state between one or more of the following: visible, partially visible, invisible, and semitransparent. The full keyboard visually appears when a home-row definition event takes place or when the user has rested their fingers without typing for a settable threshold amount of time. As the user begins to type, the keyboard fades away to invisible until the user performs any one of a number of actions including, but not limited to: a home-row definition event, pausing typing, pressing on four fingers simultaneously, or some other uniquely identifying gesture. In another embodiment, the keyboard does not fade away to be completely invisible, but rather becomes semitransparent so the user can still discern where the keys are, but can also see content of the screen that is "beneath" the on-screen keyboard.

In one embodiment, the keyboard temporarily "lights", or makes visible, the tapped key as well as those immediately surrounding the tapped key in a semitransparent manner that is proportional to the distance from the tapped key. This illuminates the tapped region of the keyboard for a short period of time.

In one embodiment, the keyboard becomes "partially" visible with the keys having the highest probability of being selected next lighting up in proportion to that probability. As soon as the user taps on a key, other keys that are likely to follow become visible or semivisible. Keys that are more likely to be selected are more visible, and vice versa. In this way, the keyboard "lights" the way for the user to the most likely next key(s).

In one embodiment, the onscreen keyboard is made temporarily visible by the user performing tap gestures (such as a double- or triple-tap in quick succession) on the outer rim of the enclosure surrounding the touch-sensitive surface.

The various modes of visual representation of the on-screen keyboard may be selected by the user via a preference setting in a user interface program.

FIGS. 2A-F show an exemplary process performed by the device 100. The flowcharts shown in FIGS. 2A-F are not intended to fully detail the software of the present invention in its entirety, but are used for illustrative purposes.

Figure 2A:
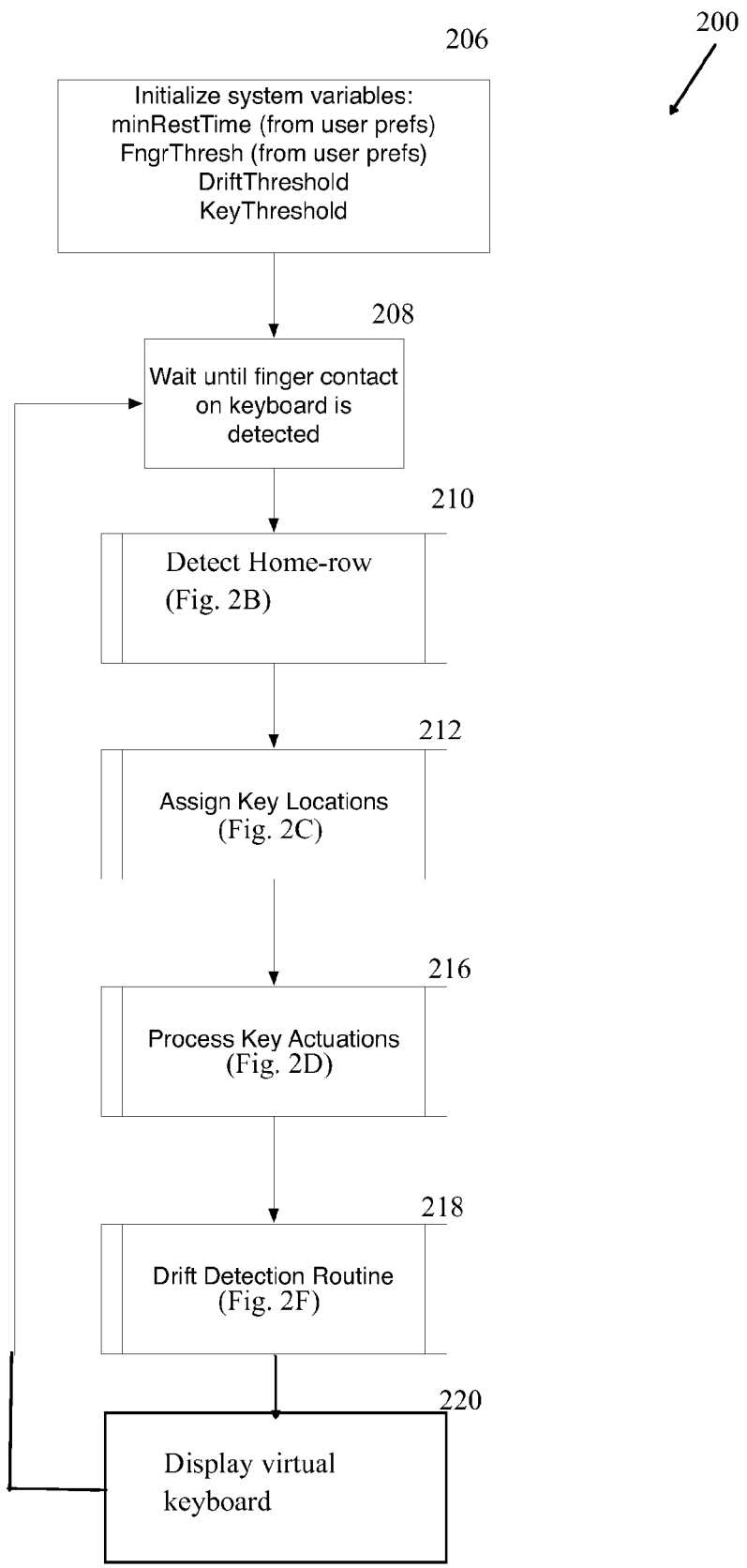
FIGS. 2A through 2F show a flowchart of exemplary processes performed by the system shown in FIG. 1.

FIG. 2A shows a process 200 executed by the processor 100 based on instructions provided by the OSK software component 172. At block 206, when the process 200 is first started, various system variables are initialized, such as minimum rest time, number of finger touch threshold, drift distance threshold and key threshold. At block 208, the process 200 waits to be notified that a contact has occurred within the area of a touch-screen. Then, at block 210, home-row detection occurs based on signals from one or more of the sensors 120, 130. Home-row detection is described in more detail in FIG. 2B. At a block 212, locations of keys for the to-be-displayed virtual keyboard are determined based on the sensor signals. The key location determination is described in more detail in FIG. 2C. Next, at block 216, key activations are processed (see FIGS. 2D and E for more detail.) At a block 218, user's finger drift is detected based on the sensor signals. Finger drift is described in more detail in FIG. 2F. Then, at block 220, a virtual keyboard is presented on the display 140 based on at least one of the determinations made at blocks 210-218. The process 200 repeats when a user removes their eight fingers and then makes contact with the touchscreen.

Figure 2B:
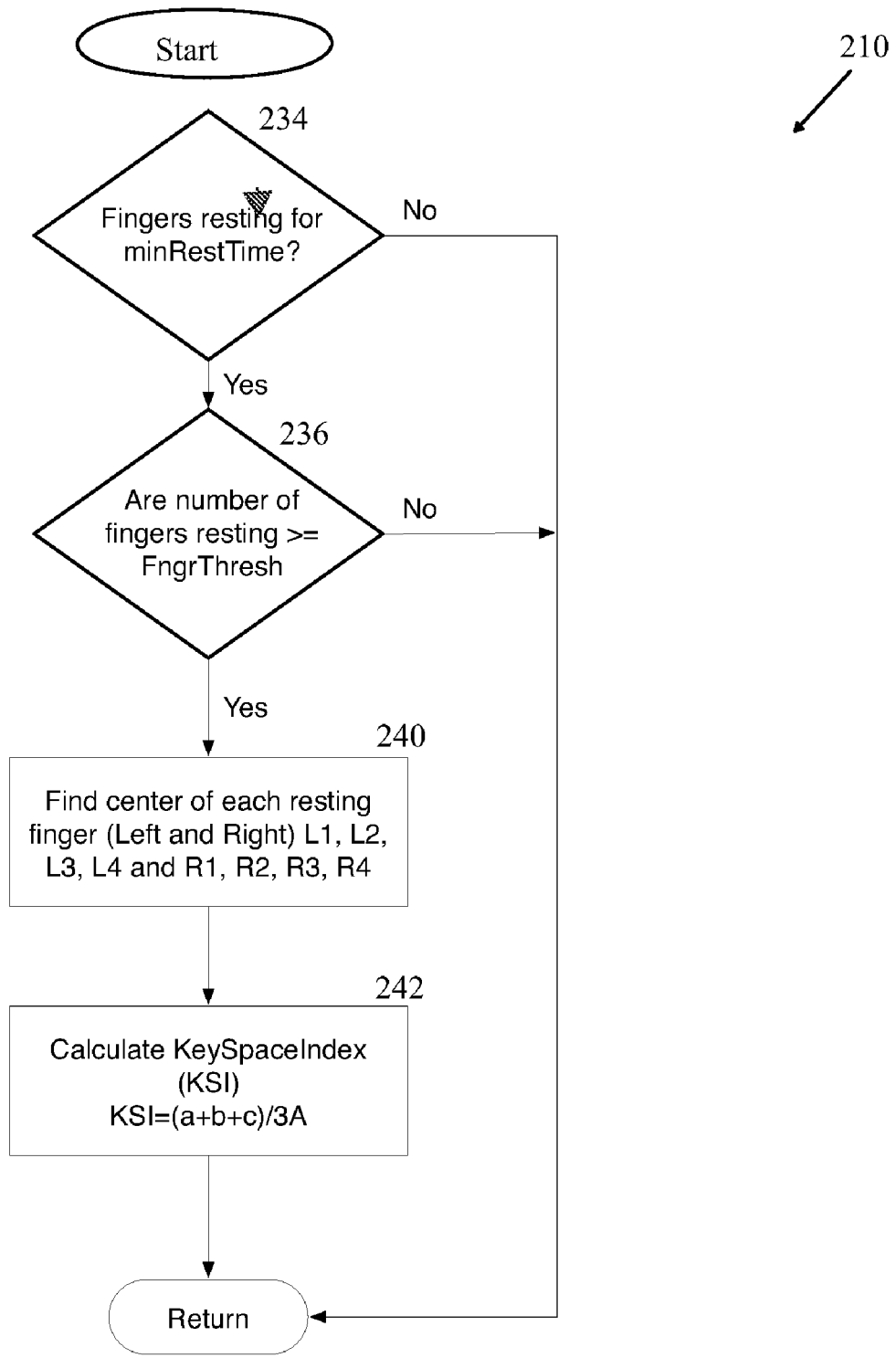

FIG. 2B shows the home-row detection process 210. At a decision block 234, the process 210 determines if a user has rested their fingers on the touch-screen for a minimum amount of time (i.e., minimum rest threshold). At a decision block 236, the process 210 determines if the appropriate number of fingers have rested on the touch surface, thus initiating a home-row definition event. If the conditions in either blocks 234 or 236 are not met, the process 210 exits without changing the location of the on-screen keyboard.

Once both the time and number of resting fingers requirements are met, the processor 110 determines the location of the resting fingers, see block 240. A KeySpaceIndex (or "KSI") value is then determined in block 242. The KSI is used to customize the on-screen keyboard to the size and spacing of the user's fingers.

The KSI may change from one home-row definition event to the next, even for the same user. In one embodiment, all four fingers of each hand are resting on the touch surface to initiate the home-row definition event. In such a case, the KSI is given by the following formula:

$$KSI=(\text{Average RestingKey Spacing})/(\text{Modeled Nominal Spacing})=[(a+b+c)/3]/A=(a+b+c)/3A$$

where,

A=a modeled nominal distance between keys (typically 19 mm)

a=the measured distance between RestingKey1 and RestingKey2 b=distance between RestingKey2 and RestingKey3 c=distance between RestingKey3 and RestingKey4.

The KSI formula can be adjusted accordingly if fewer than four resting fingers are used to initiate a home-row definition event (as defined in a set of user preferences stored in a database). The KSI is used in subsequent processes.

A data model for a standard onscreen keyboard is stored in memory of the system. In this data model, the onscreen keyboard layout is divided into two sections: keys normally typed with the right hand, and keys normally typed with the left hand. Further, each key is related to the home-row resting key that is rested upon by the finger that is most likely to type that particular key (defined as the "related resting key"). The location of each key is defined in the data model as a relative measurement from its related resting key.

An exemplary formula for determining the location of each key is given as:

$$\text{Key}(x', y')=\text{KeyModel}(x*\text{KSI}, y*\text{KSI})$$

Where, x=the nominal stored x distance from the center of the Related Resting Key (RRK)

y=the nominal stored y distance from the center of the RRK

It is possible that the modified key positions of two or more keys may overlap. If that is the case, the size of the overlapping keys is reduced until the overlap is eliminated.

The orientation of the X-Y axis is determined separately for each resting key. For each of the left and right sectors, a curve is fit to the resting keys in that sector. The X-Y axis for each key is then oriented to be the tangent (for the x-axis) and orthogonal-tangent (for the y-axis) to the curve at the center of that key.

Figure 2C:
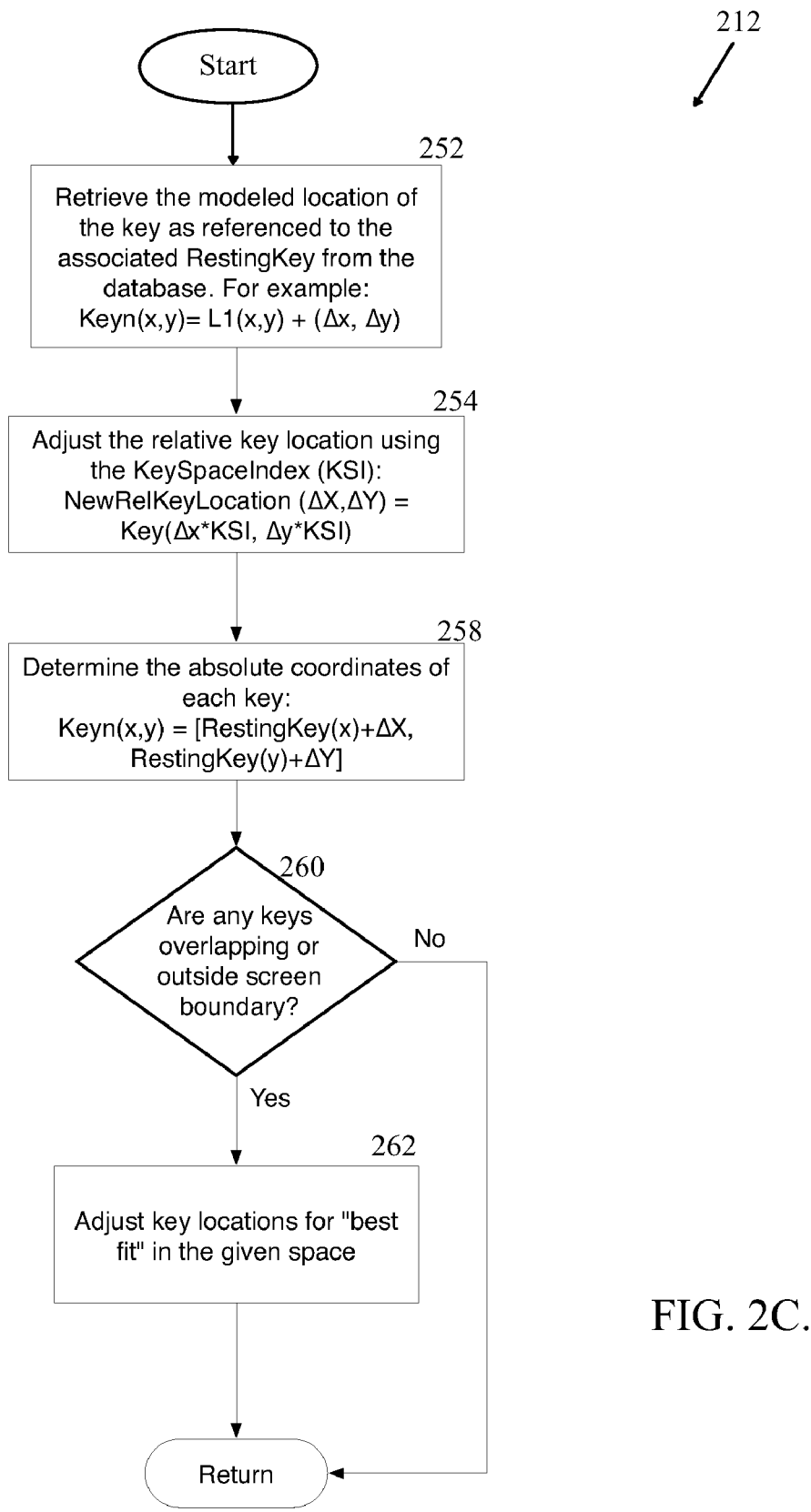

FIG. 2C shows the assigning key locations process 212. The process 212 is repeated for each key of the keyboard. At block 252, a prestored location for each key is retrieved from the database 181, relative to its associated resting key position in the form [RestingKey, Δx, Δy]. For example, the key representing the letter "R" is associated with the resting key L1 (typically the letter "F"), and is positioned up and to the left of L1. Thus, its data set would be [L1, −5, 19] (as measured in millimeters). Similar data is retrieved for each key from the database 181. At block 254, a new relative offset is calculated for each key by multiplying the offset retrieved from the database by the KSI. At block 258, the absolute coordinates of each key is then determined by adding the new offset to the absolute location of the associated resting key as determined at block 254. At decision block 260, the process 212 tests to see if any keys are overlapping, and if so, their size and location are adjusted at block 262 to eliminate any overlap. Then the process 212 returns to the process 200.

Figure 2D:
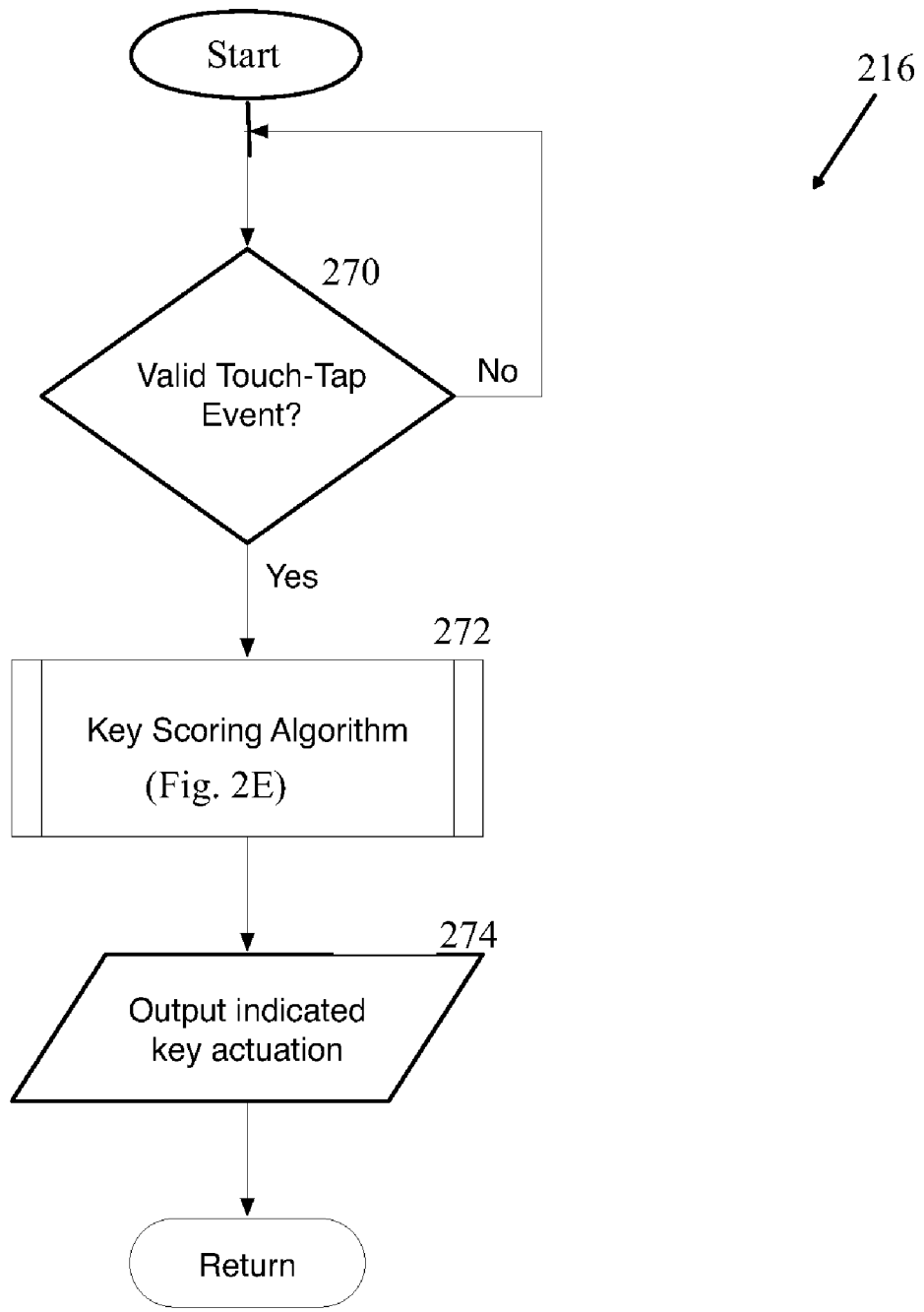

FIG. 2D shows the process-key actuations process 216, whereby the actual key events are determined and output. The process 216 begins at decision block 270 that tests if a valid touch-tap event has occurred. This is determined through a correlation between the touch sensor(s) 120 and vibration sensor(s) 130 as explained more fully in Marsden et al., U.S. Patent Application Serial No. 2009/0073128. Candidate keys are scored by applying a key scoring algorithm at block 272. The key with the highest score is then 0output at block 274 and the process 216 returns.

Figure 2E:
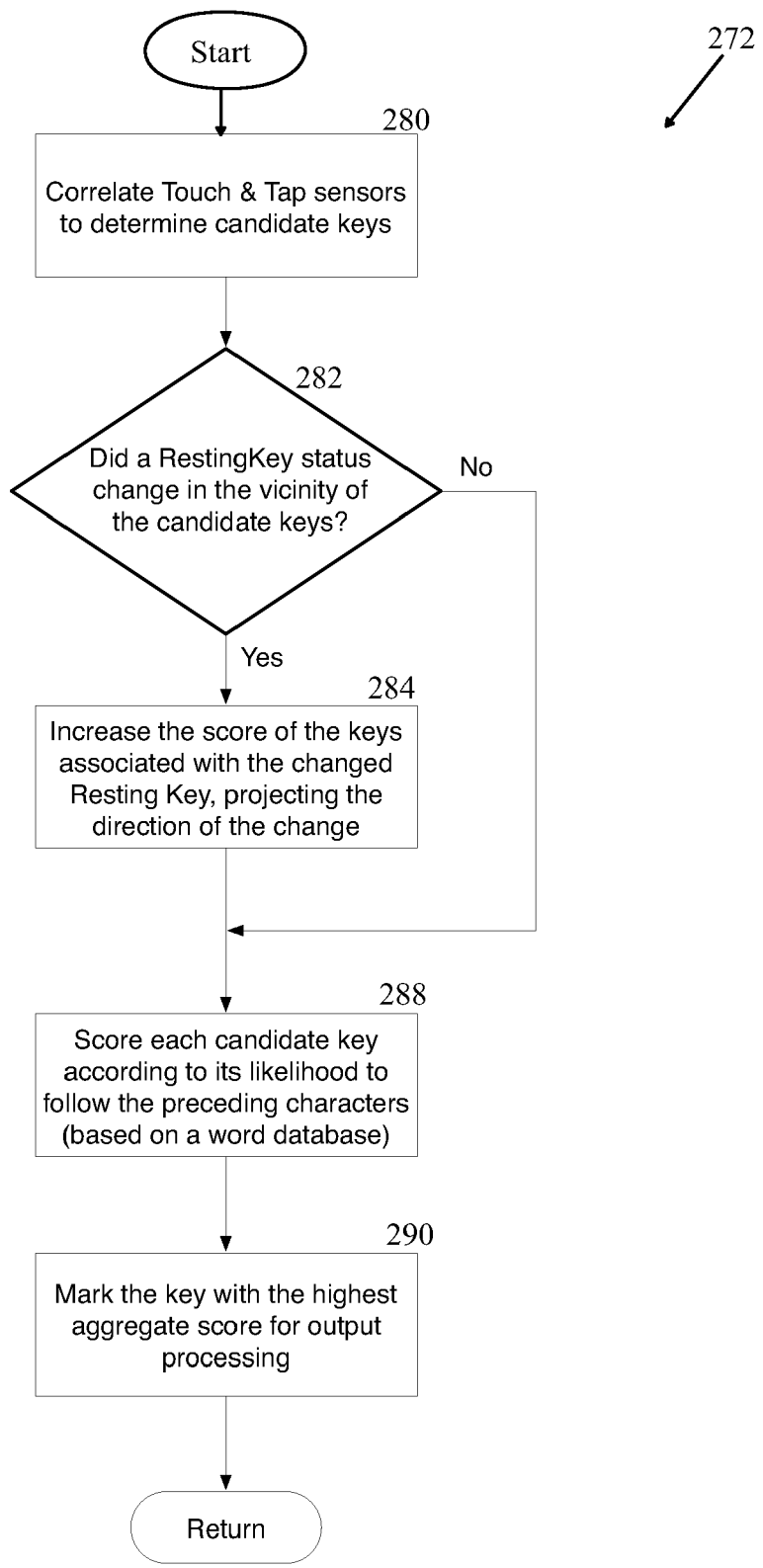

FIG. 2E shows a process for the key scoring algorithm from block 272 of FIG. 2D. At block 280, signals received by the touch sensors 120 and the vibration sensors 130 are correlated to determine where the user's tap took place and defines keys in the immediate vicinity as "candidate keys". By considering keys surrounding the area of the tap (rather than just the key where the tap took place), the processor 110 accounts for ambiguity in the user's typing style. At a decision block 282, the process 272 tests to see if the user moved their finger from a resting key to type. Note that in typical typing styles, even a 10-finger touch typist will not constantly rest all four fingers at all times. So, it isn't a prerequisite that a change in a resting key take place in order for a valid key to be typed on. However, if a change does take place to the state of a resting key in the vicinity of the candidate keys (or if it is a candidate key itself), useful information can be obtained from such change as explained at block 284. At block 284 a virtual line is calculated between the resting key in the vicinity of the tap for which a state change was detected, and the location of the tap, as calculated at block 280. The virtual line extends beyond the tap location. At block 284 keys that the projected line passes through or by are determined and the processor 110 increases the score of those keys accordingly. In this way, relative movements in the direction of the desired key are correlated to that key, even if the tap location doesn't occur directly on the key. At block 288, the processor 110 takes into account the preceding words and characters that were typed as compared with linguistical data stored in data memory 181. This includes commonly known disambiguation methods such as: letter-pair statistical frequencies, partial-match prediction, inter-word prediction, and intra-word prediction. Appropriate scoring is assigned to each candidate key. At block 290, the candidate key with the highest score representing the highest calculated probability of the user's intended selection is determined and the process 272 returns.

Figure 2F:
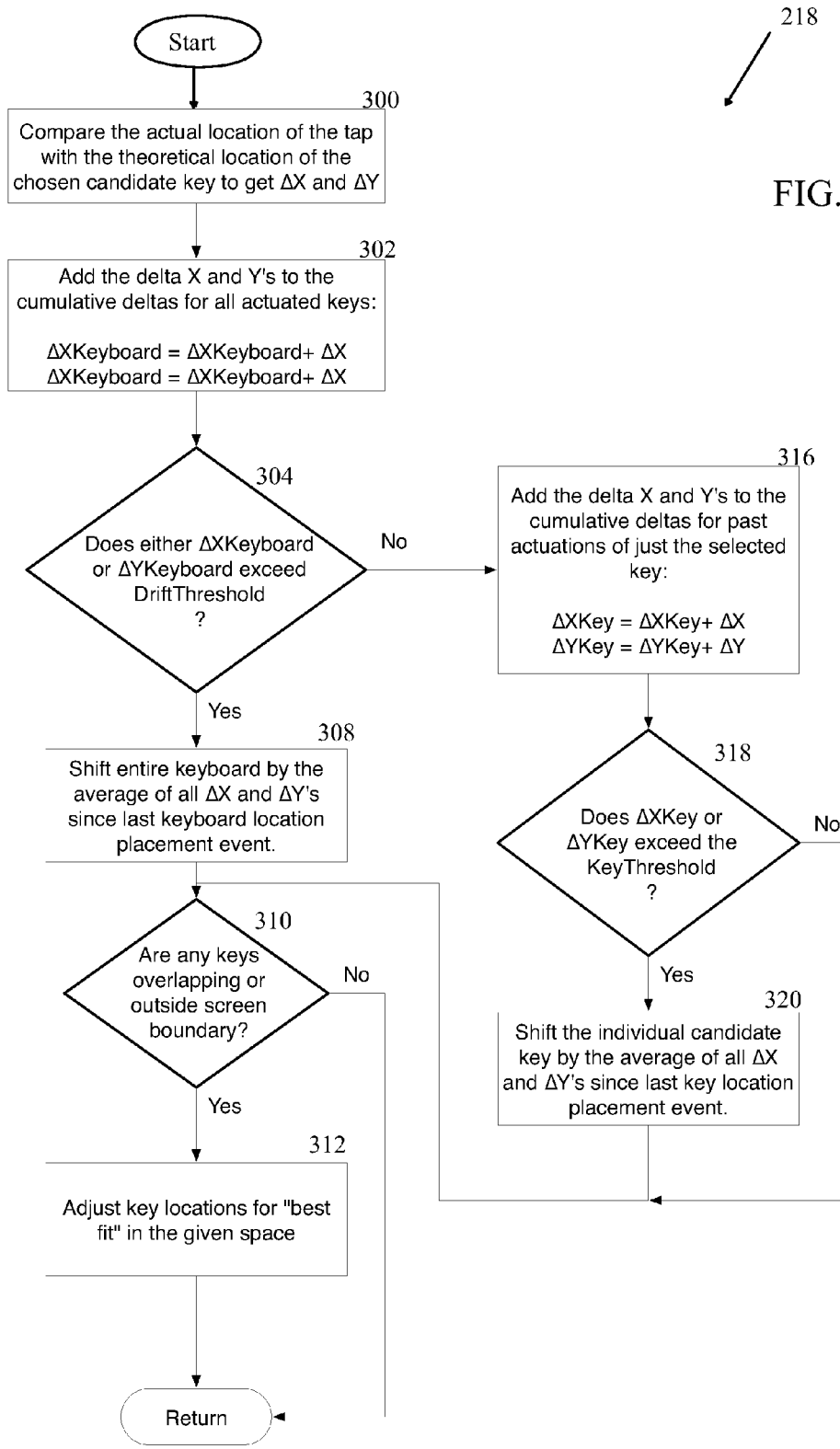

FIG. 2F shows the drift detection process 218 for accommodating when the user inadvertently moves their hands (or "drifting") as they type. The process 218, at block 300, compares the actual tap location with the current center of the displayed intended key, and stores the difference in the X and Y coordinates as ΔX and ΔY. These differences are added to a previous cumulative total from previous keystrokes at block 302. At decision block 304, the processor 110 tests if the cumulative difference in either direction exceeds a prestored variable called "DriftThreshold" (as defined from user preference or default data stored in data memory 182). If the threshold is exceeded, the processor 110 moves the location of the entire keyboard in block 308 by the average of all ΔXs and ΔYs since the last location definition event. If the cumulative differences do not exceed the DriftThreshold for the entire keyboard, then a similar calculation for the individual selected key is performed at block 316. At decision block 318, the processor 110 tests if the cumulative differences for that individual key exceeds the user-defined key threshold after block 316 and, if so, adjusts its location at block 320. The key threshold is the permissible amount of error in the location of the tap as compared to the current location of the associated key. When key threshold has been exceeded, the associated key will be moved. After block 308, if the decision at block 318 is No, or after block 320, then at block 310, the processor 110 tests if any of the new positions overlap with any other keys and if the overall keyboard is still within the boundaries of the touch sensors. If there are any conflicts for either test, they are corrected with a "best fit" algorithm in block 312 and then exits. Also, if no conflicts are found, the process 218 returns.

Even though the method of the present invention will allow the user to type without the onscreen keyboard being visible, there are still times when a user will want to view the keys. For example, if they don't know which key is associated with a desired character, or where certain characters are located on a separate numeric and/or symbols layer. Other users may not be able to type from rote, knowing by memory where each character is located. For these, and other reasons, it is important to visually present the onscreen keyboard on the screen of the device.

According to stored user's preference, the onscreen keyboard can remain visible continuously while typing is taking place. Alternatively, the onscreen keyboard becomes transparent after the home-row definition event. In one embodiment, the onscreen keyboard becomes semitransparent so-as to allow the user to see through the keyboard to content on the screen below.

In the case where the keyboard is set to be invisible, other content may be displayed on the full screen. There may be other user interface elements, such as buttons, that will appear to be active yet be located below the invisible onscreen keyboard. In such a case, the device 100 intercepts the user's input directed toward such an element and causes the onscreen keyboard to become visible, reminding the user that it is indeed present. The user may then elect to "put away" the keyboard by pressing a corresponding key on the keyboard. Note that putting away the keyboard is not the same as making it invisible. Putting away the keyboard means to "minimize" it off the screen altogether, as is a common practice on touchscreen devices.

In one embodiment, the onscreen keyboard cycles between visible and invisible as the user types. Each time the user taps on the "hidden" onscreen keyboard, the onscreen keyboard temporarily appears and then fades away after a user-settable amount of time.

In one embodiment, only certain keys become visible after each keystroke. The keys that become temporarily visible are those keys that are most likely to follow the immediately preceding text input sequence (as determined based on word and letter databases stored in the system).

In one embodiment, the onscreen keyboard becomes temporarily visible when the user, with fingers resting in the home-row position, presses down on the surface with their resting fingers based on changes sensed by the touch sensors 120.

In one embodiment, the onscreen keyboard becomes visible when the user performs a predefined action on the edge of the enclosure outside of the touch sensor area, such as a double- or triple-tap.

The onscreen keyboard, if set to appear, will typically do so when a text-insertion condition exists (as indicated by the operating system 171), commonly represented visually by an insertion carat (or similar indicator).

In one embodiment, the tactile markers commonly used on the F and J home-row keys are simulated by providing haptic feedback (such as a vibration induced on the touchscreen) when the user positions their fingers to rest on those keys. In this way, the user may choose for the keyboard to remain stationary in the same onscreen position, yet find the correct placement of their hands by touch only (without looking)

To increase the accuracy of the keyboard, statistical models of language are used. If a touch/tap event yields an ambiguous key choice, the statistical models are called upon by the processor 110 to offer the key that is most likely what the user intended.

This "disambiguation" is different from other methods used for other text input systems because in the present invention a permanent decision about the desired key must be made on the fly. There is no end-of-word delineation from which word choices can be displayed to the user and the output modified. Instead, each time the user taps on a key, a decision must be made and a key actuation must be sent to a target application program (i.e., text entry program).

Several statistical analysis methods can be employed: partial-match letter prediction, current-word prediction, next-word prediction, and conjunctive next-word prediction. These are explained in detail in the following sections.

Prediction by Partial Match

A well-known algorithm originally invented for data compression useful in this case is prediction by partial match (or PPM). Applied to a keyboard, the PPM algorithm is used to predict the most likely next character, given a string of characters that has already occurred (of length k). Computing time and resources grow exponential with the value of k. Therefore, it is best to use the lowest value of k that still yields acceptable disambiguation results.

By way of example, let k=2. A process of the present invention looks back at the past two characters that have been entered and then compare probabilities from a database of the most likely next character(s) to be typed. For example, the underlined letters below show what is used to predict the next most likely letter:

A<u>n</u>
<u>An</u>
A<u>ne</u>
An <u>ex</u>
An e<u>xa</u>
An ex<u>am</u>
An exa<u>mp</u>
An exam<u>pl</u>
An examp<u>le</u>

The data storage required for this algorithm for a total number of possible keys A is:

$$A^{k+1}$$

For a typical onscreen keyboard, this process consumes less than 1 MB of data.

The statistical model is built up for each language (although with a small value for k); the table may be similar for languages with common roots. The model also dynamically updates as the user enters text. In this way, the system learns the users typing patterns and more accurately predicts them as time goes on.

Language variants are provided in the form of language-specific dictionaries configured through an operating system control panel. The control panel identifies the current user's language from the system locale and selects the appropriate prediction dictionary. The dictionary is queried using a continuously running "systray" application that also provides new word identification and common word usage scoring.

In one embodiment, a database made up of commonly used words in a language is used to disambiguate intended key actuations. The algorithm simply compares the letters typed thus far with a word database, and then predicts the most likely next letter based on matches in the database.

For example, say the user has typed "Hel". Possible matches in the word database are:

Hello (50)
Help (20)
Hell (15)
Helicopter (10)
Hellacious (5)

The numbers beside each word represent their "frequency" of use, normalized to 100. (For convenience sake, the total frequencies in this example add up to 100; but that would not normally be the case).

The candidate letters that most likely follow "Hel" are:

L (70)—probabilities added for the words "Hello", "Hell", and "Hellacious"
P (20)
I (20)

This example is particularly useful, in that the letters L, P, and I are all in close proximity to one another. It is possible, and even likely, that the user may tap on a location that is ambiguously near several keys (I, O, P, or L, for example). By adding word prediction, the choice is significantly disambiguated; in this example, the obvious most-likely next letter is "L".

Note that this implementation of the word prediction algorithm is different from that traditionally used for onscreen keyboards, because it is not truly a word prediction system at all: it is a letter prediction system that uses a word database.

In one embodiment, word pairs are used to further disambiguate the most likely selected key. With simple word prediction, there is no context to disambiguate the first letter of the current word; it is completely ambiguous. (This disambiguation is reduced slightly for the second letter of the word, and so on for the remainder of the word.) The ambiguous nature of the first few letters of a word can be significantly reduced by taking into account the word that was entered immediately previous to the current word; this is called "next-word prediction".

For example, if the word just typed was "Cleankeys", common next words stored in the database may be:

Keyboard (80)
Inc. (20)
Is (20)
Will (15)
Makes (10)
Touch (5)

If the user ambiguously taps between the I and K keys for the start of the next word, the next-word prediction algorithm can help disambiguate (in this case, "K" would win).

Logic may dictate that the concept of considering the previous word typed could be carried to the previous k words typed. For example, for k=2, the system could store a database that has 2nd-degree next-words (or next-next-words) for every word in the database. In other words, look back at the two previous words in combination to determine the most likely word to follow. However, this quickly becomes unwieldy, both in terms of space and computing power. It simply isn't practical to store that many combinations, nor is it very useful, because most of those combinations would never occur.

There is, however, a significant exception that is worth considering: words that have a very large number of next-word candidates. Such is the case for parts of speech known as conjunctions and articles.

The seven most-used conjunctions in the English language are:

and, but, or, for, yet, so, nor.

The articles in the English language are:

the, a, an.

By special-casing these 10 words, the system improves first-letter predictions.

Consider the phrase: kick the_

Because every noun in the database is most likely a next-word candidate for the article "the", there is very little use derived from the next-word prediction algorithm. However, if the context of "kick" before the article "the" is retained, a much richer next-next-word choice is attained. Effectively, a new "word" is stored in the database called "kick_the". This new entity has the following next-word candidates:

Ball (50)
Bucket (20)
Habit (15)
Can (10)
Tires (5)

Thus one can confidently predict that the most likely next letter to follow the phrase "kick_the_" is the letter "B".

Any word that is found combined with a conjunction or article is combined with those parts of speech to form a new word entity.

A notable difference between the letter-by-letter prediction system described herein and a word-based prediction system is the ability to dynamically reorient the prediction for each letter. For example, if a guess is wrong for a specific key and the desired word subsequently becomes clear, the algorithm abandons the choice it made for the incorrect letter and applies predictions for the remaining letters, based on the newly determined target word.

For example:

| Text Entered | Ambiguous Candidate Keys | Predicted Words | Predicted Letter |
|---|---|---|---|
| Kick_the | B, h, g | Ball, bucket, habit, goat, garage | B |
| Kick the b | A, q, s | Ball, habit, garage | A |
| Kick the ba | B, v, space | habit | B |
| Kick the bab | I, k, o | habit | I |
| Kick the babi | T, r | habit | T |
| Kick the babit | Space, n, m | habit_ | space |

As the word progresses, it is shown that the initial letter "B" should have been an "H" (these letters are near one another on the qwerty keyboard layout and one could easily be mistaken for the other). But rather than commit completely to that first letter, and only consider words that start with "B", other candidates are still considered by the system in predicting the second letter. So, B, H, and G are considered as the first letter for subsequent keys. In this way, the mistake isn't propagated and the user would need to only make one correction instead of potentially many.

So, for each new key entered, keys that are adjacent it as well as other ambiguous candidates are considered as possibilities in determining subsequent letters.

When a mistake is made and the user backspaces and corrects it, the system can feed that data back into the algorithm and make adjustments accordingly.

For example, the user ambiguously enters a key in the middle of the keyboard and the scoring algorithm indicates that potential candidates are "H", "J", and "N"; the scores for those three letter fall into the acceptable range and the best score is taken. In this example, let's say the algorithm returns the letter "J" as the most likely candidate and so that is what the keyboard outputs. Immediately following this, the user unambiguously types a <backspace> and then an "H", thus correcting the error.

This information is fed back into the scoring algorithm, which looks at which subalgorithms scored an "H" higher than "J" when the ambiguous key was originally entered. The weighting for those algorithms is increased so if the same ambiguous input were to happen again, the letter "H" would be chosen. In this way, a feedback loop is provided based directly on user corrections.

Of course, the user can make typing mistakes themselves that are not the result of the algorithm; it correctly output what the user typed. So, care must be taken when determining if the user correction feedback loop should be initiated. It typically occurs only when the key in question was ambiguous.

A user-settable option could allow the keyboard to issue backspaces and new letters to correct a word that was obviously wrong. In the example above, once the predictor determines that the only logical word choice is "habit", the keyboard would issue backspaces, change the "b" to an "h", reissue the subsequent letters (and possibly even complete the word).

With so many factors lending to the disambiguation of a key, all algorithms can potentially add to the candidacy of a key. This approach is called scoring; all algorithms are weighted and then added together. The weighting is dynamically changed, to tune the scoring algorithm to the user's typing style and environment.

Figure 3A:
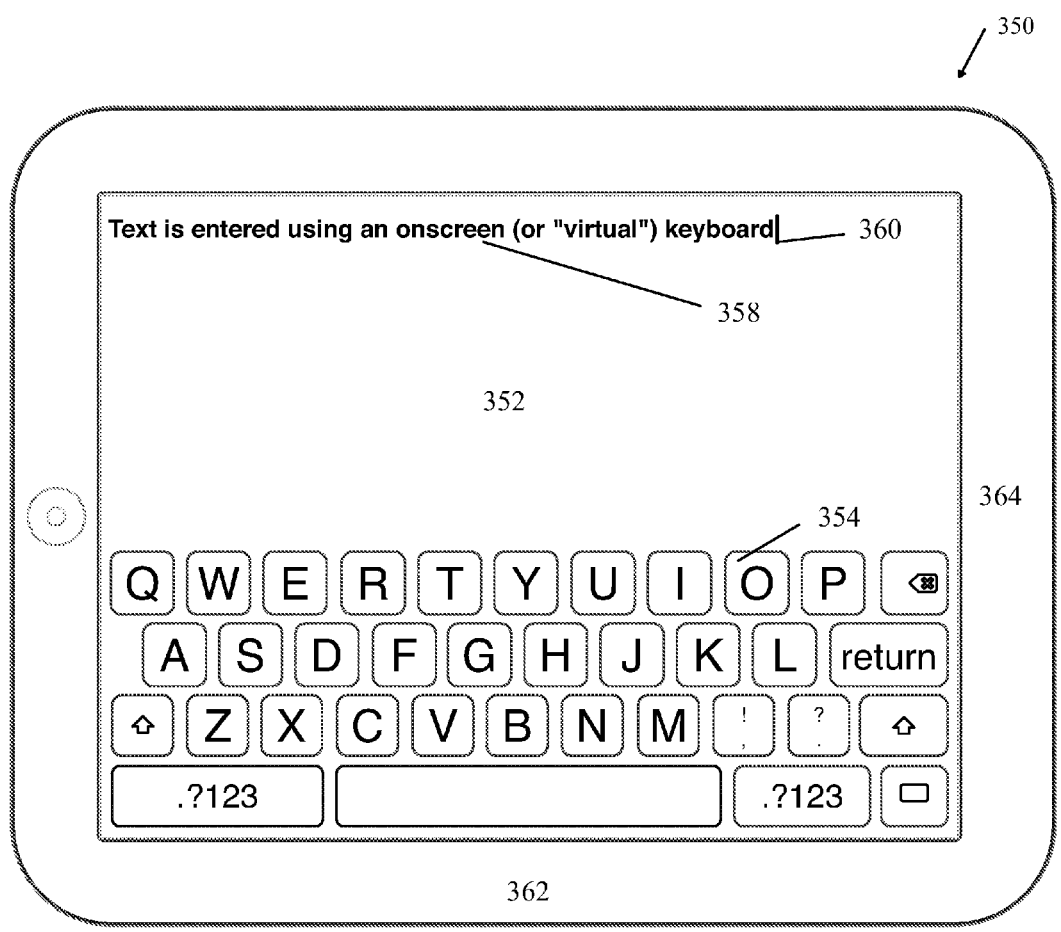
FIG. 3A is a schematic view a tablet device with a flat-surfaced virtual keyboard formed in accordance with an embodiment of the present invention.

FIG. 3A shows a schematic view representative of a typical handheld tablet computer 350 that incorporates on its forward-facing surface a touch-sensitive display 352 and a keyboard 354 designed and used in accordance with an embodiment of the present invention. The keyboard 354, when used in accordance with the present invention, generates text that is output to the text display region 358 at a text insertion location 360. The term "keyboard" in this application refers to any keyboard that is implemented on a touch- and tap-sensitive surface, including a keyboard presented on a touch-sensitive display. The keyboard 354 shows the letters of the alphabet of the respective language selected by the user on individual keys, arranged in approximately the standard "QWERTY" arrangement found on most keyboards.

In one embodiment, the orientation, location, and size of the keyboard (as well as individual keys) are adaptively changed according to the input behavior of the user. When the user rests their fingers on the touch surface 352 in a certain way, the system moves the keyboard 354 to the location determined by the resting fingers. When the user intends to actuate a key on the keyboard 354, they "tap" on the desired key by lifting their finger and striking the surface 352 with discernable force. User taps that occur on areas 362, 364 outside of the touch sensor area 352 are detected by the vibration sensor(s) and may also be assigned to keyboard functions, such as the space bar.

The absence of a touch sensor signal is in effect, a signal with a value of zero, and when correlated with a tap (or vibration) sensor can be used to uniquely identify a tap location. In one embodiment, the vibration signal for specific regions outside of the touch sensor area 352, such as those indicated at areas 362, 364, are unique and stored in a database by the system. When the absence of a touch signal occurs in conjunction with a tap event, the system compares the vibration characteristics of the tap with those stored in the database to determine the location of the external tap. In one embodiment, the lower outer boundary area 362 is assigned to a space function, while the right outer boundary area 364 is assigned to a backspace function.

Figure 3B:
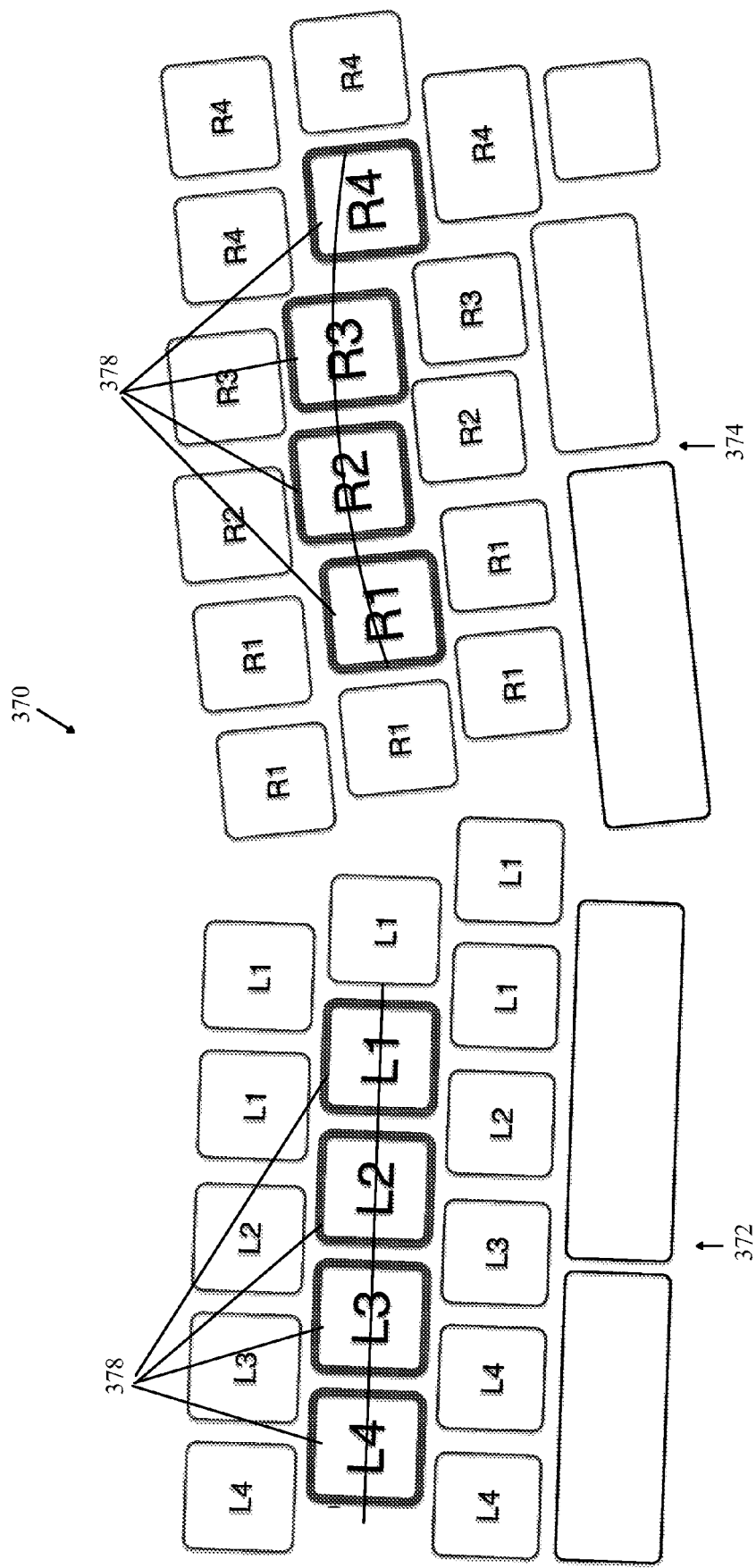
FIGS. 3B and 3C illustrate keyboard displays formed in accordance with embodiments of the present invention.

FIG. 3B is a schematic view representative of an exemplary virtual on-screen keyboard 370. The keyboard 370 is divided into two halves: a left half 372 and a right half 374 (as correlates to the left and right hands of the user). The two separate halves 372, 374 are not aligned with each other. The eight keys 378 that are typically rested on by the user are labeled in bold according to which finger is typically used for that key (e.g., L1 represents the index finger of the left hand, L4 represents the little finger of the left hand, and so on). All other nonhome-row keys are indicated by a label showing which finger is normally used to type that key using conventional touch-typing techniques. It should be noted, however, that there are many typing styles that do not use the finger placements as shown in FIG. 3B, and those labels are included herein for illustrative purposes only.

The left half of the keyboard 372 shows all the keys aligned in horizontal rows, as they would be on a traditional electromechanical keyboard. In one embodiment as shown on the right half 374, the home-row keys are dispersed along an arc to better fit the normal resting position of the user's four fingers. Nonhome-row keys are similarly dispersed in accordance with their relative location to the home-row resting keys. Further, in one embodiment, the size of each key may also vary in accordance with the statistical likelihood that the user will select that key (the higher the likelihood, the larger the key).

Figure 3C:
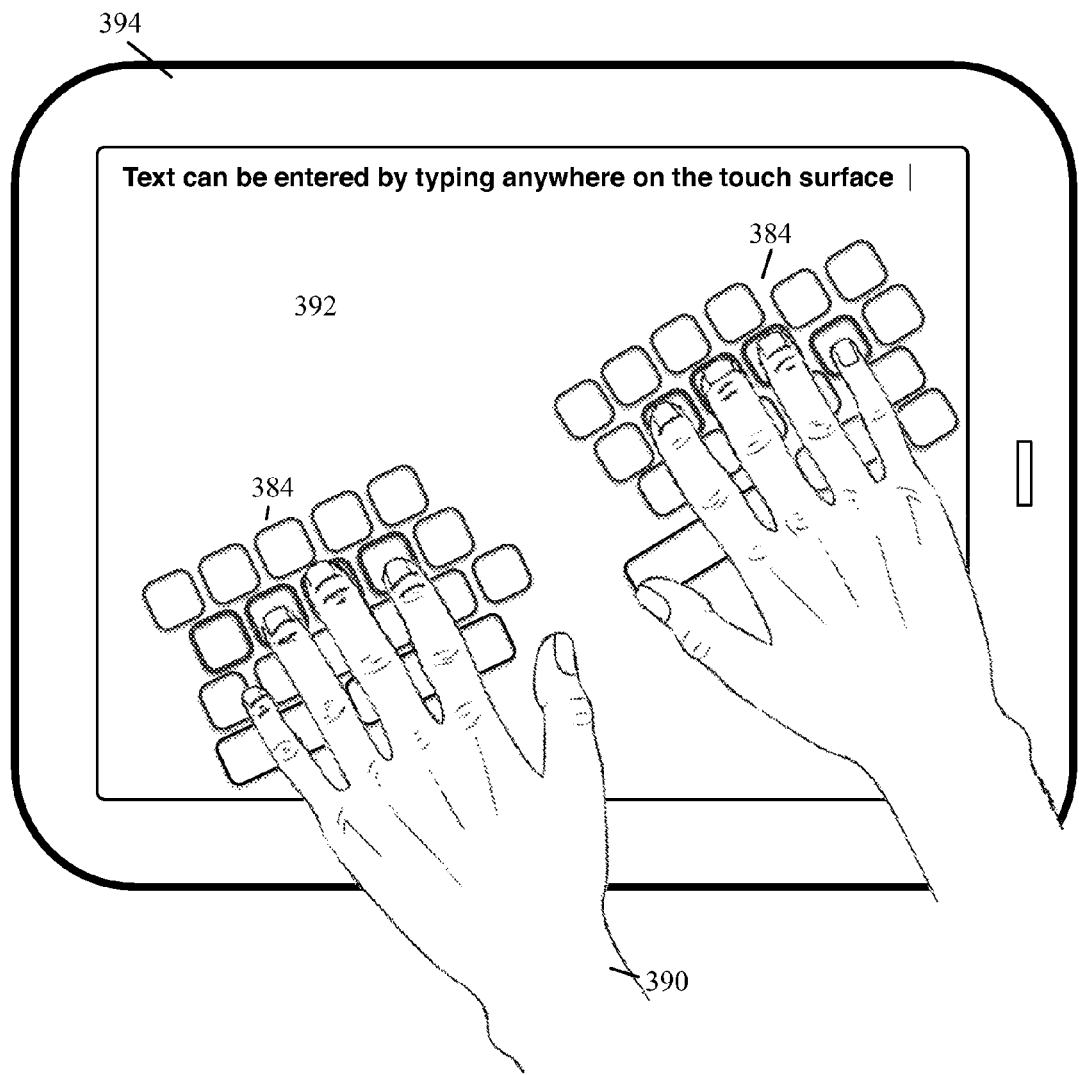

FIG. 3C is a schematic view representative of the virtual on-screen keyboard 384 that is oriented at an angle in accordance with an embodiment of the present invention. The user may rest their hands 390 on the touch-sensitive surface 392 of a typical handheld tablet computer 394 at any location and orientation that they wish. In this case, the hands are spread apart further than normal and oriented at an angle as referenced to the straight edges of the device 394. The user initiates an action indicating a "home-row definition event", which, may include, but is not limited to, the following: resting all eight fingers for a short, user-definable period of time; double-tapping all eight fingers simultaneously on the surface 392 and then resting them on the surface 392; or pressing down all eight fingers simultaneously as they are resting on the surface 392. In another embodiment, not all eight fingers are required to initiate a home-row definition event. For example, if someone was missing their middle finger, a home-row definition event may be initiated by only three fingers on that hand. Here the user has rested their hands 290 at an angle on the tablet computer 394, thus causing a processor of the computer 294 to generate and display the virtual on-screen keyboard 384 at an angle.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device comprising:
   a display;
   a plurality of touch sensors coupled to the display, the plurality of touch sensors configured to generate touch sense signals based on sensed user touches on the display;
   one or more vibration sensors, the vibration sensors configured to generate vibration signals based on sensed vibrations of the housing;
   a processor in signal communication with the display, the plurality of touch sensors, and the one or more vibration sensors, wherein the processor is configured to
      determine a keyboard orientation gesture based on the generated touch sense signals and the vibration signals;
      generate and present on the display an image of a keyboard having a plurality of keys based on the determined keyboard orientation gesture or the generated vibration signals determined to coincide with the location of the user's fingers;
      correlate the touch sensor signals with the vibration sensor signals to disambiguate between the user resting their fingers and the user actuating a key; and
      output a pre-determined keyboard event when a key is determined to have been actuated by the user; and
   a housing configured to contain the display the plurality of touch sensors, the one or more vibration sensors, and the processor.

2. The device of claim 1, wherein the processor is configured to determine location of the keyboard image on the display based on the generated sense signals.

3. The device of claim 1, wherein the processor is configured to determine location of the keyboard image on the display based on determination of existence of a home-row definition event.

4. The device of claim 3, wherein the processor determines an existence of the home-row definition event when two or more generated sense signals are determined to be active for a predefined amount time.

5. The device of claim 4, wherein the processor is configured to,
   determine locations of home-row keys of the keyboard image based on determination of location of the generated two or more sense signals, and
   determine locations of non-home-row keys of the keyboard image based on determined location of at least one of the home-row keys.

6. The device of claim 4, wherein the processor is configured to,
   determine sizes of home-row keys of the keyboard image based on determination of location of the generated two or more sense signals, and
   determine sizes of non-home-row keys of the keyboard image based on determined location of at least one of the home-row keys.

7. The device of claim 4, wherein the processor is configured to,
   determine orientations of home-row keys of the keyboard image based on determination of location of the generated two or more sense signals, and determine orientations of non-home-row keys of the keyboard image based on determined location of at least one of the home-row keys.

8. The device of claim 3, wherein the housing further comprises a vibration device configured to generate vibrations at one or more frequencies, wherein the processor is configured to cause the vibration device to activate at a predefined frequency based on the home-row definition event.

9. The device of claim 3, wherein the housing further comprises a vibration device configured to generate vibrations at one or more frequencies, wherein the processor is configured to:
   determine location of at least one user finger based on the sensor signal; and
   cause the vibration device to create a vibration at a predefined frequency when the determined location of the at least one user finger is within a threshold distance from the at least one home key.

10. The device of claim 9, wherein the vibration device is configured to alter intensity of the vibration based on distance of the at least one user finger from the corresponding home key.

11. The device of claim 3, wherein the housing further comprises an audio device configured to generate audio signals at one or more frequencies, wherein the processor is configured to:
   determine location of at least one user finger based on the sensor signal; and
   cause the audio device to create an audio signal at a predefined frequency when the determined location of the at least one user finger is within a threshold distance from the at least one home key.

12. The device of claim 11, wherein the audio device is configured to alter intensity of the audio signal based on distance of the at least one user finger from the corresponding home key.

13. The device of claim 1, wherein the processor is configured to,
   periodically receive sense signals associated with continual user finger contact with the display,
   determine if the received periodic sense signals indicate drift from locations of the sense signals used during the generation and presentation of the keyboard image, and
   move at least one key of the keyboard image on the display based on a drift indicated of the at least one key.

14. The device of claim 13, further comprising an output device, wherein the processor is configured to,
   determine if the periodically received sense signals indicate user finger contact drift is within a threshold distance of an edge of the display, and
   output a signal to the output device if user finger contact drift was determined to be within the threshold distance.

15. The device of claim 1, wherein the processor is configured to,
   sense a user typing action based on the generated sense signals and the generated motion signals, and
   change the keyboard image to be at least one of semitransparent or invisible when the user typing action is not sensed for a predefined amount of time.

16. The device of claim 15, wherein after the keyboard image has been made at least one of semitransparent or invisible, the processor is configured to cause the keyboard image to appear at least less transparent when a user typing action has been sensed.

17. The device of claim 1, wherein the processor is configured to,
   determine at least one next most likely key to be activated based one or more previous key activations, and
   uniquely display the determined at least one next most likely key.

18. The device of claim 1, wherein the processor is configured to,
   determine relative movement of one or more user fingers from the home-row keys based on the generated sense signals, and
   generate a key activation event based on the generated motion signals and the determined relative movement.

19. The device of claim 1, wherein the processor is configured to,
   generate one or more candidate keys based on at least a portion of the generated sense signals and the generated motion signals, and
   generate a key activation event by disambiguating the generated one or more candidate keys using a statistical probability model.

20. The device of claim 19, wherein the processor is configured to,
   determine a size value for at least one key based on statistical probability model and at least one previous key activation event, and
   alter the keyboard image based on the determined size value for the at least one key.

21. The device of claim 1, wherein the processor is configured to,
   cause the presented keyboard image to be invisible in a state based on a sensed first user action, and
   cause the presented keyboard image to be invisible in an inactive state based on a sensed second user action.

22. The device of claim 1, wherein the generated at least one motion signal is associated with a location relative to the housing,
   wherein the processor is configured to identify a function based on the location relative to the housing, when the at least one motion signal has been generated and no sense signals have been generated.

* * * * *